United States Patent
Allen

(10) Patent No.: US 7,461,868 B2
(45) Date of Patent: Dec. 9, 2008

(54) GASKET RELEASE TOOL

(76) Inventor: Nicholas S. Allen, 108 Krystal Nicole La., Mooresville, NC (US) 28115

( * ) Notice: Subject to any disclaimer, the term of this patent is extended or adjusted under 35 U.S.C. 154(b) by 232 days.

(21) Appl. No.: 10/907,354

(22) Filed: Mar. 30, 2005

(65) Prior Publication Data

US 2005/0225081 A1    Oct. 13, 2005

Related U.S. Application Data

(60) Provisional application No. 60/557,570, filed on Mar. 30, 2004.

(51) Int. Cl.
*F16L 55/00* (2006.01)
(52) U.S. Cl. .................... 285/39; 285/314; 285/104
(58) Field of Classification Search ............. 285/39, 285/232, 308, 314, 104, 23
See application file for complete search history.

(56) References Cited

U.S. PATENT DOCUMENTS

| | | | | |
|---|---|---|---|---|
| 889,315 A | * | 6/1908 | Kenyon ........................ 29/256 |
| 3,148,902 A | * | 9/1964 | Gardner, Sr. et al. ........ 285/339 |
| 4,240,651 A | * | 12/1980 | Mariaulle ..................... 285/39 |
| 4,728,076 A | * | 3/1988 | Ganshorn et al. ......... 251/149.6 |
| 4,781,400 A | * | 11/1988 | Cunningham ................. 285/39 |
| 5,292,157 A | * | 3/1994 | Rubichon ..................... 285/39 |
| 5,295,697 A | | 3/1994 | Weber et al. |
| 6,186,557 B1 | * | 2/2001 | Funk ........................... 285/39 |
| 6,312,019 B1 | * | 11/2001 | Nakazumi et al. ............. 285/39 |
| 6,467,811 B2 | * | 10/2002 | Mitchell ...................... 285/15 |
| 6,612,623 B2 | * | 9/2003 | Salomon-Bahls ........... 285/308 |
| 6,775,890 B2 | * | 8/2004 | Kolarik ....................... 29/235 |

* cited by examiner

*Primary Examiner*—David E Bochna
(74) *Attorney, Agent, or Firm*—Adams Intellectual Property Law, P.A.

(57) ABSTRACT

A tool for separating a gasketed pipe joint includes a body comprising a relatively thin member formed into a partially cylindrical shape having spaced-apart forward and rear edges; and an arcuate reinforcing collar attached to an outer surface of the body adjacent the rear edge. A driving apparatus for the tool includes a first driving ring adapted to be mounted around one of the pipes and sized to bear against the gasket release tool; a second driving ring adapted to be mounted around the other one of the pipes and sized to bear against the socket; and apparatus for drawing the first and second driving rings together so as to drive the gasket release tool into a pipe joint.

16 Claims, 15 Drawing Sheets

GASKET RELEASE TOOL

CROSS-REFERENCE TO RELATED APPLICATIONS

This application claims the benefit of Provisional Application No. 60/557,570 Filed Mar. 30, 2004.

BACKGROUND OF THE INVENTION

This invention relates generally to joints for ductile iron pressure pipe and more particularly to a tool for disconnecting ductile iron pipes which have been joined with toothed gaskets.

In many applications where pipes are joined in telescoping relationship, for example water and sewer pipes, the smooth or spigot end of one pipe is inserted into the socket end of the engaging pipe. The socket end has an opening large enough to receive the spigot end of the enclosed pipe. A gasket is inserted in the socket end of the enclosing pipe and prevents leakage of fluid from the joint by forming a seal between the two pipes. In applications where the fluid such as water for fire mains or municipal water distribution is under high pressure, various means are used to prevent separation of the two pipes. Although pipes may be connected with bolted flanges, blocks or other external restraining devices to prevent separation, these methods are costly and time consuming.

Another known method to prevent separation of the pipes is to use a rubber gasket which serves as a fluid seal and which also has toothed metal segments spaced uniformly around its inner perimeter. The metal segments pivot about a bead to allow the spigot end of one pipe to be inserted into the socket end of the other pipe while preventing withdrawal of the inserted pipe under high fluid pressure conditions. The toothed metal segments bite into the outer surface of the spigot of the inserted pipe and prevent withdrawal of the inserted pipe. Such gaskets are described in U.S. Pat. No. 5,295,697 assigned to U.S Pipe & Foundry Company, Birmingham, Ala., USA 35222, and available under the name FIELD LOK from the same company.

The significant holding power of this type of gasket represents a drawback when a pipe joint must be taken apart. In order to disconnect pipes joined with one of these gaskets, it is first necessary to release all of the individual toothed metal segments. If a single one of the segments is not released, it will be impossible to separate the pipes, even with heavy construction equipment. In the prior art, the pipes have been separated using an array of narrow shim-type tools which are driven into the pipe joint to release each individual segment. However, such tools are prone to breakage and are tedious to use because the exact location of each toothed segment around the periphery of the pipe joint is not known. If all of the teeth cannot be released, the pipes must then be separated by cutting. This requires subsequent patching or replacement with new pipes, which is wasteful and time consuming.

BRIEF SUMMARY OF THE INVENTION

Accordingly, it is an object of the invention to provide a tool for simultaneously releasing all of the toothed segments of a pipe gasket.

It is another object of the invention to provide a method for simultaneously releasing all of the toothed segments of a pipe gasket.

It is another object of the invention to provide an apparatus for driving a release tool without impact tools.

These and other objects are met by the present invention, which according to one embodiment provides: a tool for separating a gasketed pipe joint, including: a body comprising a relatively thin member formed into a partially cylindrical shape having spaced-apart forward and rear edges; and an arcuate reinforcing collar attached to an outer surface of the body adjacent the rear edge.

According to another embodiment of the invention, a chamfer is formed on the forward edge According to another embodiment of the invention, the body and the reinforcing collar are made from stainless steel.

According to another embodiment of the invention, the body has a thickness of about 16 gage.

According to another embodiment of the invention, the reinforcing collar has a thickness of about 0.5 inches According to another embodiment of the invention, at least one weld bead is disposed on a rear face of the reinforcing collar to harden the face and reduce deformation of the reinforcing collar under impact.

According to another embodiment of the invention, the body extends through an angle of approximately 180 degrees in a circumferential direction According to another embodiment of the invention, the body extends through an angle of approximately 120 degrees in a circumferential direction.

According to another embodiment of the invention, the body extends through an angle of approximately 90 degrees in a circumferential direction.

According to another embodiment of the invention, a method is provided for separating a pipe joint of the type including a first pipe received inside a second pipe and restrained therein by a resilient gasket carrying an annular array of toothed rigid segments which engage an outer surface of the first pipe to prevent withdrawal thereof. The method includes: providing at least one gasket release tool having a body formed into an arcuate shape and adapted to be received between the first and second pipes; placing one or more of the gasket release tools along an outer surface of the first pipe, such that the gasket release tools collectively engage all of the rigid segments; and driving the gasket release tools to into the joint so as to disengage the rigid segments from the first pipe.

According to another embodiment of the invention, each of the gasket release tools includes an arcuate reinforcing collar attached to an outer surface of the body adjacent a rear edge thereof.

According to another embodiment of the invention, each of the gasket release tools extends through an angle in a circumferential direction such that two of the tools engage all of the rigid segments.

According to another embodiment of the invention, each of the gasket release tools extends through an angle in a circumferential direction such that three of the tools engage all of the rigid segments.

According to another embodiment of the invention, each of the gasket release tools extends through an angle in a circumferential direction such that four or more of the tools engage all of the rigid segments.

According to another embodiment of the invention, an apparatus is provided for separating a pipe joint of the type including a first pipe received inside an enlarged socket of the second pipe and restrained therein by a resilient gasket carrying an annular array of toothed rigid segments which engage an outer surface of the first pipe to prevent withdrawal thereof. The apparatus includes: at least one gasket release tool having a body formed into an arcuate shape and adapted to be received between the first and second pipes; and a driving apparatus, including: a first driving ring adapted to be mounted around one of the pipes and sized to bear against the gasket release tool; a second driving ring adapted to be mounted around the other one of the pipes and sized to bear against the socket; and driving means for drawing the first and second driving rings together so as to drive the gasket release tool into the joint.

According to another embodiment of the invention, each of the driving rings includes one or more arcuate rings segments adapted to be joined together.

According to another embodiment of the invention, each of the ring segments has: an annular flange; and an annular band extending axially from said annular flange.

According to another embodiment of the invention, the driving means includes at least one rod connecting the first and second driving rings, the rod engaging at least one fastener such that relative movement of the rod and the fastener causes axial motion of the driving rings.

According to another embodiment of the invention, the driving means includes at least one actuator connecting the first and second driving rings.

According to another embodiment of the invention, the driving means includes: at least one hydraulic cylinder connecting the first and second driving rings; and means for selectively supplying pressurized fluid to hydraulic cylinder.

According to another embodiment of the invention, at least one of the driving rings includes at least one restraint disposed so as to engage the gasket release tool and prevent the gasket release tool from moving radially outward.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
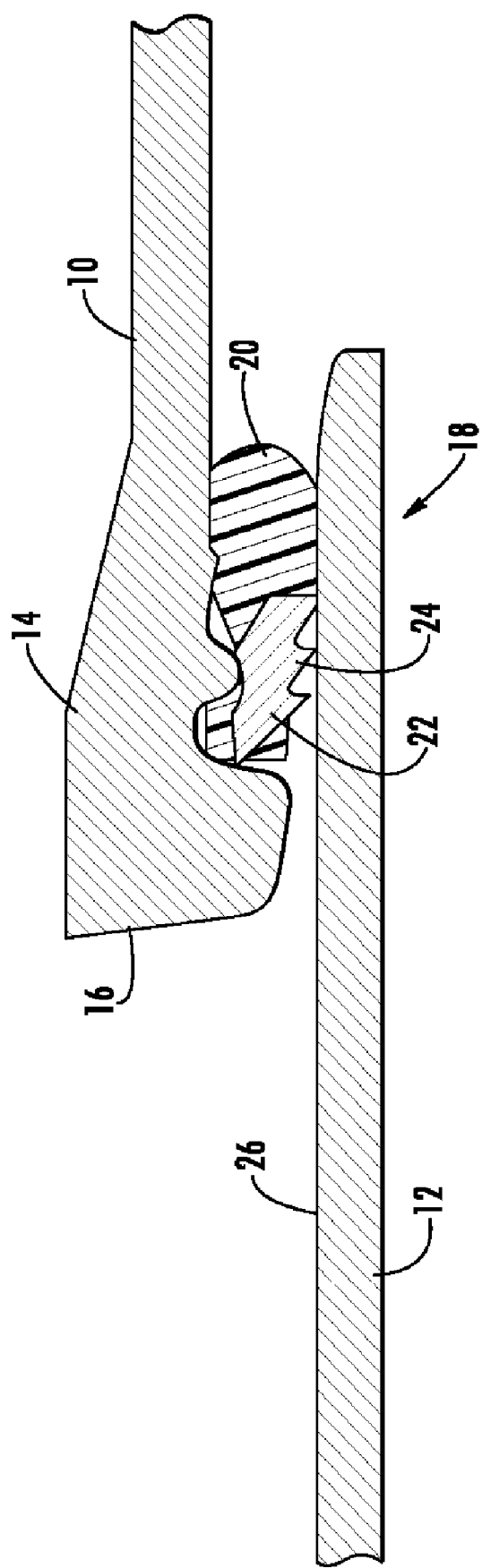
FIG. 1 is a half-sectional view of two pipes connected together with a gasket having toothed metal segments.
Figure 2:
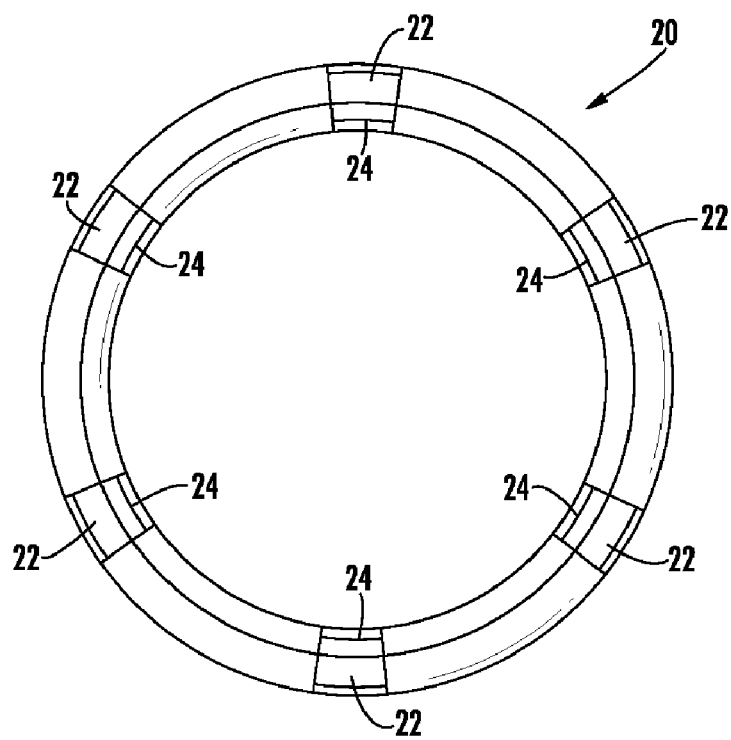
FIG. 2 is an end view of the gasket depicted in FIG. 1
Figure 3:
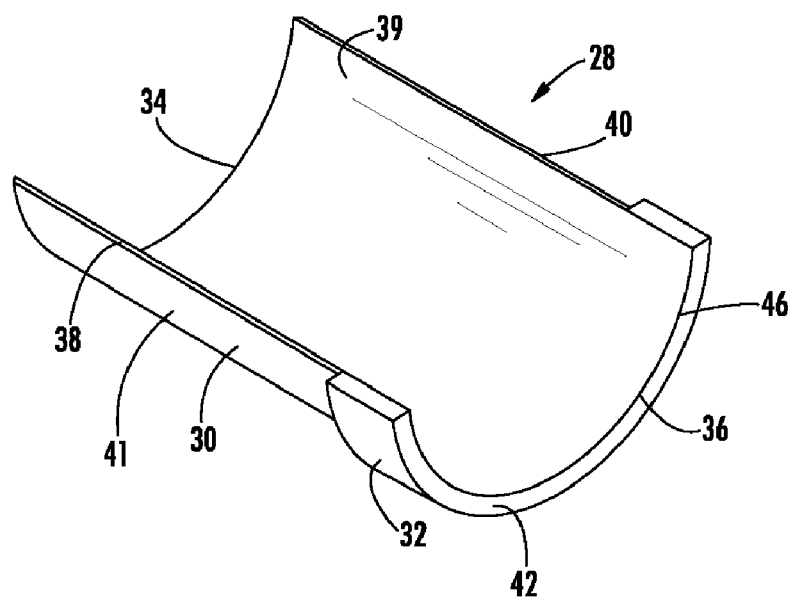
FIG. 3 is a perspective view of a gasket release tool constructed in accordance with the present invention.
Figure 4:
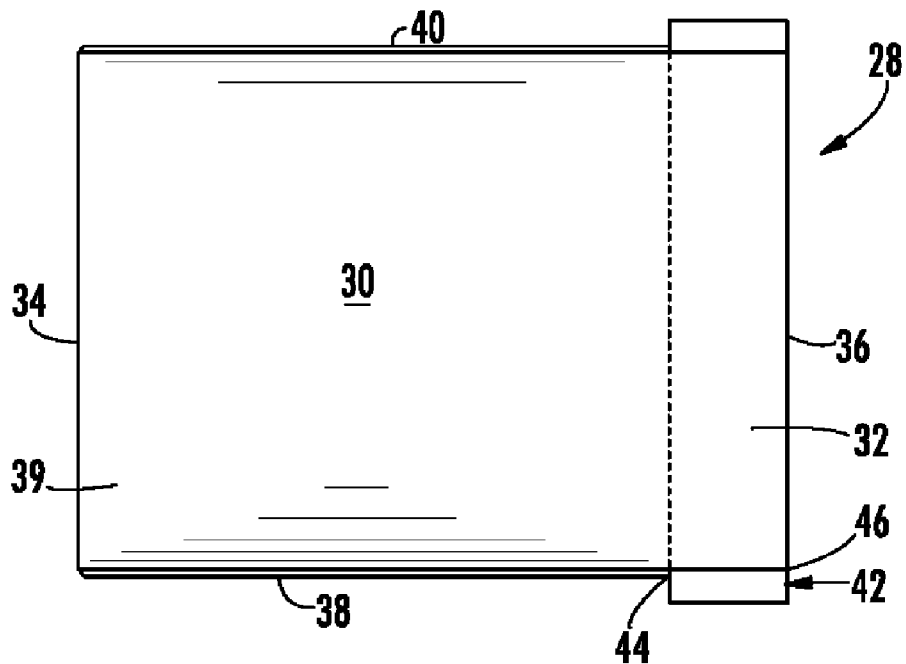
FIG. 4 is a top view of the gasket release tool of FIG. 3.
Figure 5:
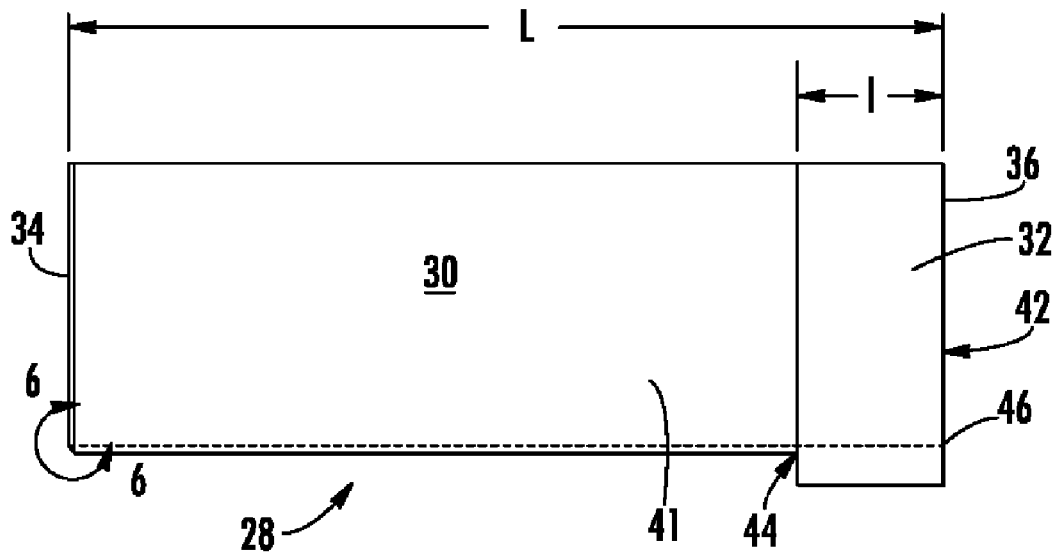
FIG. 5 is a side view of the gasket release tool of FIG. 3.
Figure 6:
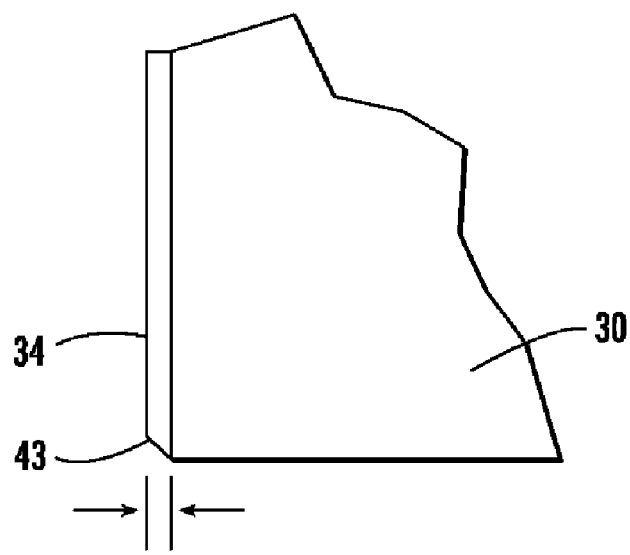
FIG. 6 is an enlarged view of a portion of FIG. 5.
Figure 7:
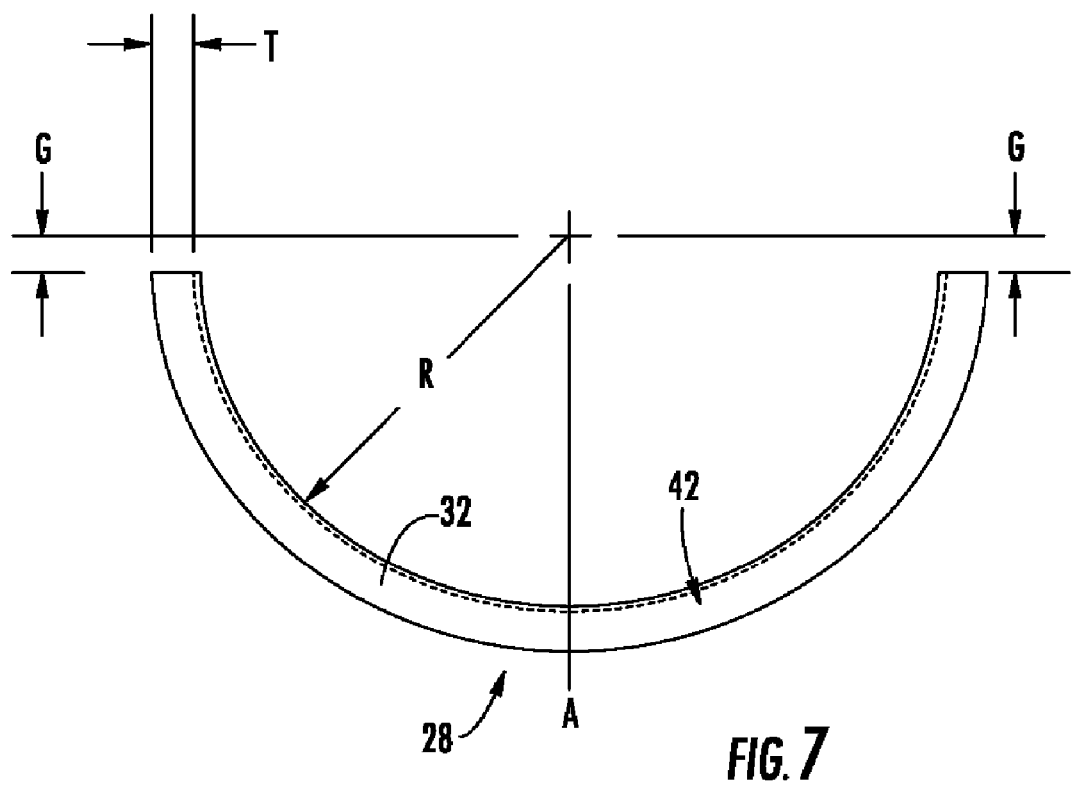
FIG. 7 is an end view of the gasket release tool of FIG. 3.

Referring to the drawings wherein identical reference numerals denote the same elements throughout the various views, FIG. 1 is a partial sectional view of a pair of first and second joined pipes 10 and 12. The first pipe 10 has an enlarged-diameter socket 14 including an end face 16 which receives the smooth or spigot end 18 of the second pipe 12. A gasket 20 including a plurality of metal segments 22 each having several teeth 24 (see FIG. 2) is disposed between the first and second pipes 10 and 12 such that the teeth 24 bite into the outer surface 26 of the second pipe 12. The number and spacing of the segments 22 will vary from gasket to gasket, however the circumferential spacing of the segments 22 will be generally constant as the diameter of the gasket 20 changes, i.e. a larger gasket will typically have more segments 22.

FIGS. 3-7 depict a gasket release tool 28 constructed according to the present invention. The gasket release tool 28 comprises a body 30 and a reinforcing collar 32. The body 30 is a partially cylindrical shape and includes a forward edge 34, a rear edge 36, spaced-apart side edges 38 and 40, and radially inner and outer surfaces 39 and 41. The illustrated gasket release tool 28 has an overall length "L" in the longitudinal direction of about 30.5 cm (12 in.). The length L may be varied to suit a particular application so long as it is sufficient to reach the gasket 20 when inserted in the pipe joint. In another example, the length L may be about 10.2 cm (4 in.) The forward edge 34 includes a chamfer 43, for example it may be about 0.8 mm (1/32 in.) wide at 45°. The material and thickness of the body 30 are chosen so that it will have adequate stiffness to resist buckling as it is driven in, yet still be thin enough to easily release the toothed segments 22. One suitable material is 304 stainless steel of 16 gage thickness. The reinforcing collar 32 is made of an appropriate material which can be securely attached to the body 30 and which will have adequate strength to withstand repeated blows by a sledgehammer or other tool which is used to drive the gasket release tool 28. One suitable material is 304 stainless steel, which has good hardness and corrosion resistance. In the illustrated example the reinforcing collar has a thickness "T" of about 1.27 cm (0.5 in.) thick in the radial direction and a length I of about 5cm (2 in.). The reinforcing collar 32 may be attached to the body 30 in a position so that its rear face 42 is slightly offset in the longitudinal direction away from the rear edge 36 of the body. The reinforcing collar 32 is secured to the body with circumferential welds 44 and 46. If desired, one or more weld beads (not shown) may be built up on the rear face 42 of the reinforcing collar 32 to harden it and reduce deformation under impact. The external surfaces of the gasket release tool 28 may be polished or otherwise provided with a smooth surface finish to reduce friction during use.

Several of the dimensions of the gasket release tool 28 will vary depending upon the exact size and type of pipe that the gasket release tool 28 is to be used with. These include the inside radius "R" of the gasket release tool 28, the circumferential angle "A" through which the gasket release tool 28 extends, and the number "N" of gasket release tools 28 required to disconnect a pair of joined pipes. The radius R is selected so that the gasket release tool 28 will fit against the outer surface of a spigot end of a pipe to be disconnected. This may be done by simply forming the body 30 of the gasket release tool 28 around the outside diameter of a pipe. The arc center of the gasket release tool 28 is offset by a gap distance "G" to prevent binding of the side edges 38 and 40 of adjacent gasket release tools 28 as they are placed around the pipes to be separated. The angle "A" is selected to be large enough so that the gasket release tool 28 will definitely engage several of the toothed metal segments 22 without the user having to manually align the gasket release tool 28 with the segments 22, and small enough so that the gasket release tool 28 will not be too difficult to drive into the pipe joint. The number of gasket release tools 28 needed N is related to the angle A. For example if the angle A is 180°, then two gasket release tools 28 are needed to encircle a pipe joint, whereas if the angle A is 120°, then three gasket release tools 28 are required.

The following Table 1 gives suitable approximate dimensions for gasket release tools 28 designed to be used with various diameter ANSI class 350 ductile iron pipes. These dimensions are merely an example and may be varied to suit a particular application.

TABLE 1

| pipe inside diameter | tool inside radius, R | angle A | gap distance G | number of segments N |
|---|---|---|---|---|
| 20.3 cm (8 in.) | 10.95 cm (4.3125 in.) | 180° | 1.27 cm (0.5 in.) | 2 |
| 30.5 cm (12 in.) | 16.19 cm (6.375 in.) | 120° | 1.27 cm (0.5 in.) | 3 |
| 40.6 cm (16 in.) | 20.3 cm (8 in.) | 120° | 1.27 cm (0.5 in.) | 3 |
| 60.7 cm (24 in.) | 30.5 cm (12 in.) | 90° | 1.27 cm (0.5 in.) | 4 |

Figure 8:
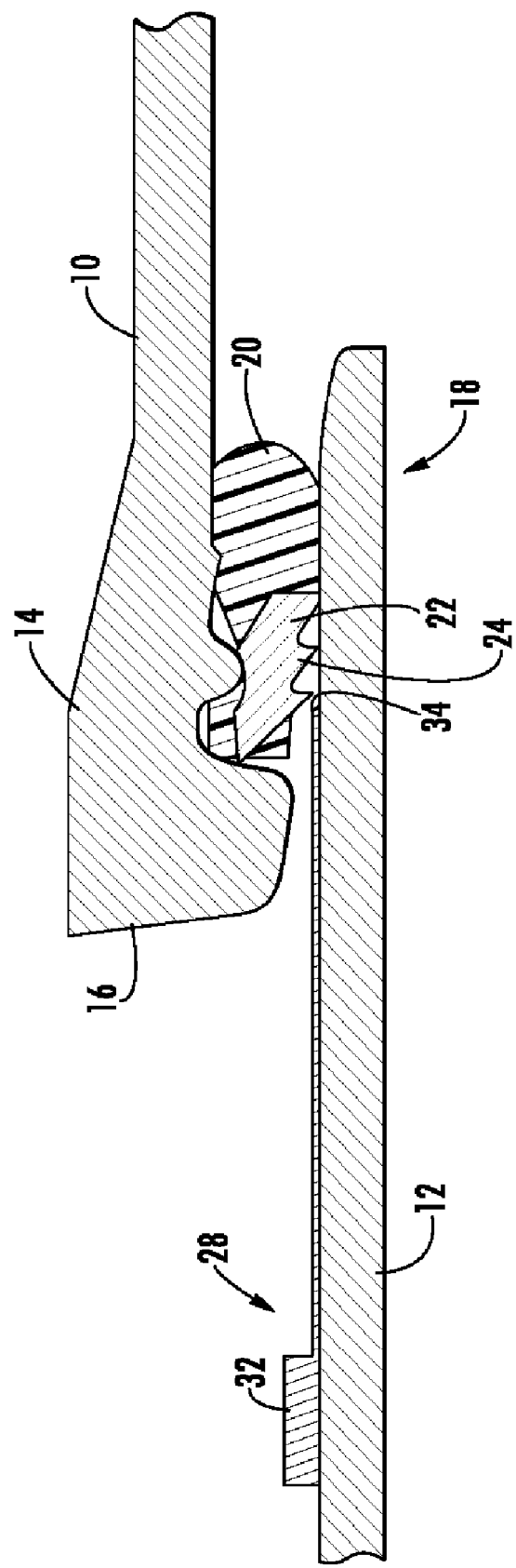
FIG. 8 is a cross-sectional view of the gasket release tool of the present invention being prepared to release a toothed gasket.
Figure 9:
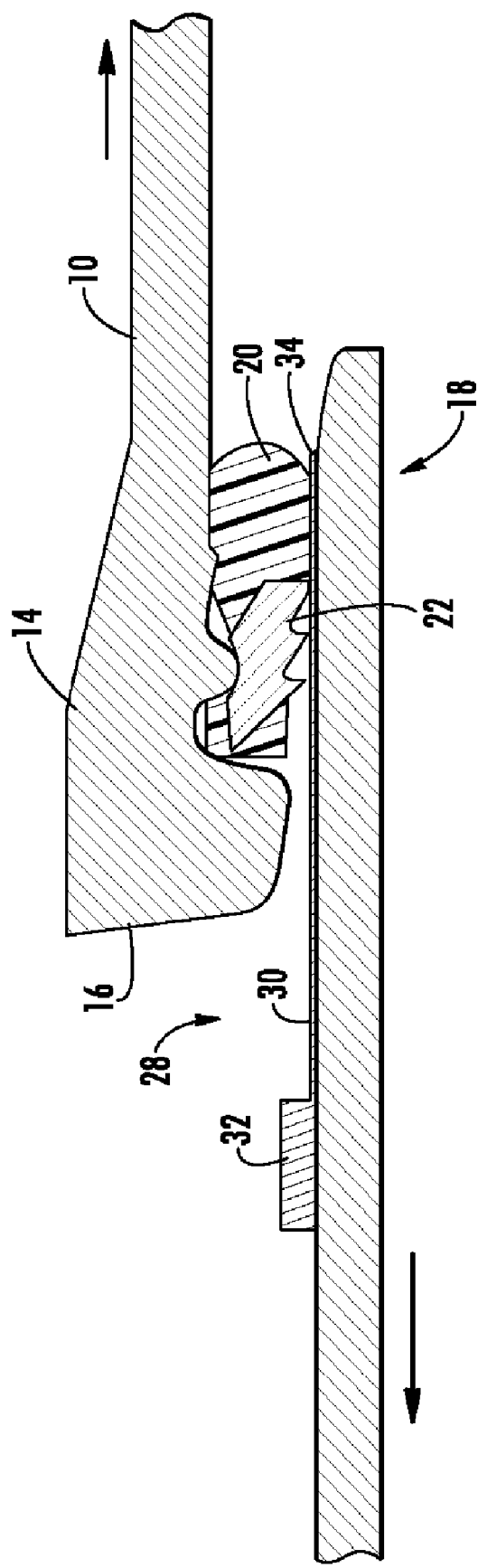
FIG. 9 is a cross-sectional view of the gasket release tool inserted into the joint between the pipes shown in FIG. 6.

The use of the gasket release tool 28 will now be described with respect to FIGS. 8 and 9. The gasket release tool 28 is prepared for use by placing it in contact with the outer surface 26 of the second pipe 12, as shown in FIG. 8. As many gasket release tools 28 are used as needed to encircle the second pipe 12. For example, if a 180° arc tool is used, then two identical gasket release tools 28 will be placed on opposite sides of the second pipe 12. The gasket release tool 28 is slid forward until its forward edge 34 contacts the teeth 24 of the metal segments 22. The gasket release tool 28 is then driven in by blows of a sledge hammer or other appropriate tool on the reinforcing collar 32, until the body 30 of the gasket release tool 28 slides into the pipe joint and is interposed between the segments 22 and the second pipe 12, as shown in FIG. 9. The chamfer 43 helps the body 30 of the gasket release tool 28 to slide under the teeth 24. In this position, the gasket release tools 28 simultaneously release all of the segments 22 so that they cannot bite into the second pipe 12. The friction force between the gasket release tool 28 and the outer surface 26 of the second pipe 12 is substantially less than the gripping force of the teeth 24. Therefore, the first and second pipes 10 and 12 can be easily slid apart in the direction of the arrows in FIG. 9. Once the pipes 10 and 12 have been separated, the gasket release tool 28 may be removed. The first and second pipes 10 and 12 will be undamaged and ready for reuse. The gasket 20 may also be suitable for reuse in some situations.

Figure 10:
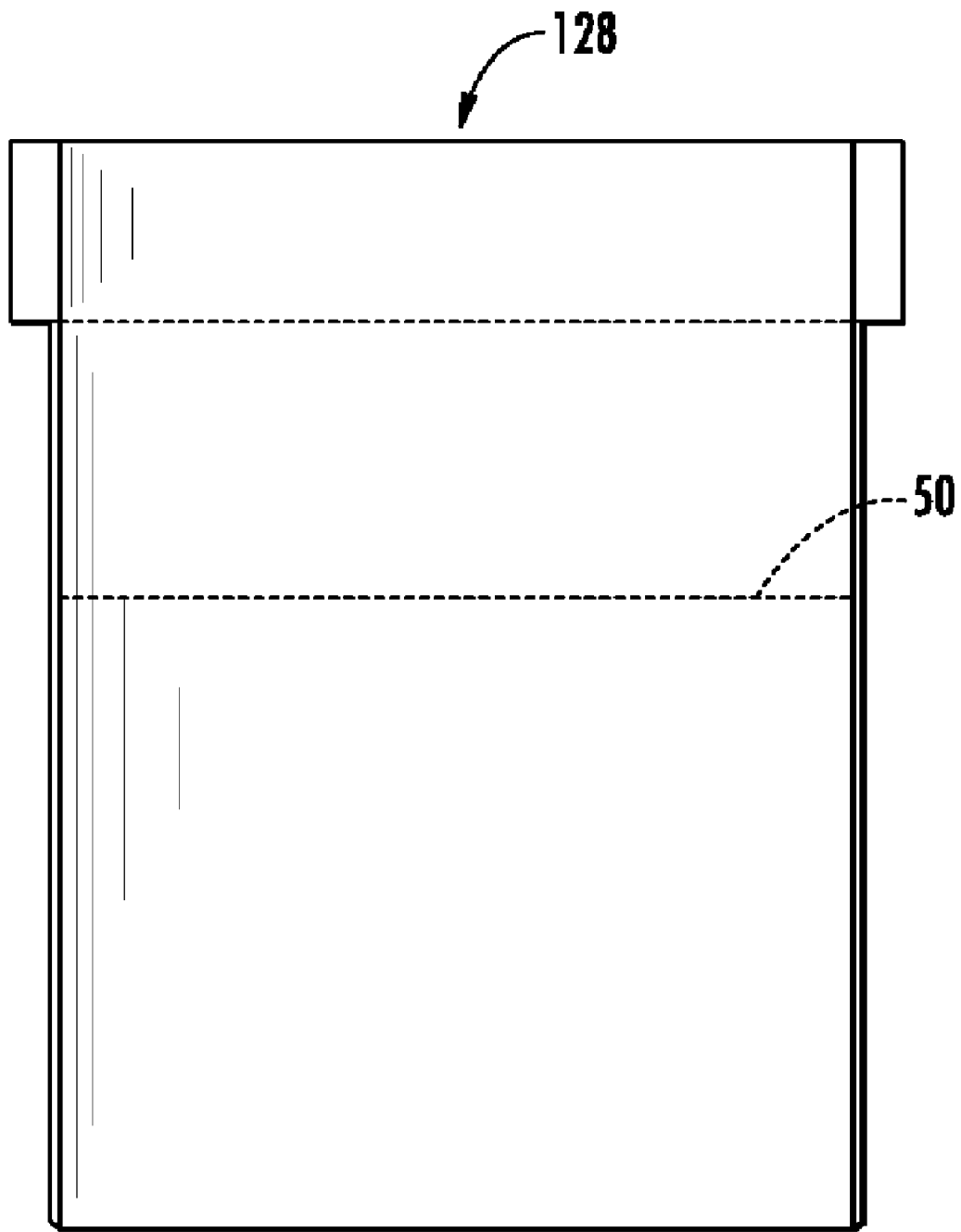
FIG. 10 is a top view of a gasket release tool having insertion markings thereon.
Figure 11:
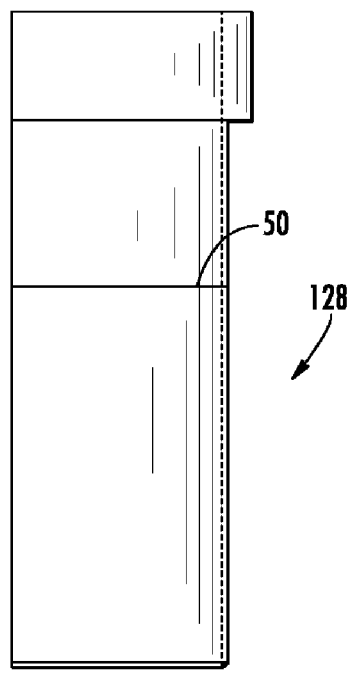
FIG. 11 is a side view of the gasket release tool of FIG. 10.

The gasket release tool 28 may optionally include stop means for indicating when the gasket release tool 28 has been driven in an adequate distance to disengage the gasket segments 22. FIGS. 10 and 11 illustrate a tool 128 in which the stop means comprises one or more indicia 50 that indicate the fully inserted position, such as a painted or printed marking such as a circumferential line, a circumferentially extending groove, or the like. Alternatively, the length L described above may selected so that the gasket release tool 28 disengages the segments 22 when it is driven to the point that the reinforcing collar 32 contacts the end face 16. For example, the length L may be about 10.2 cm (4 in.). This eliminates the need for other stops, indicia, or measurement of the driving depth.

Figure 12:
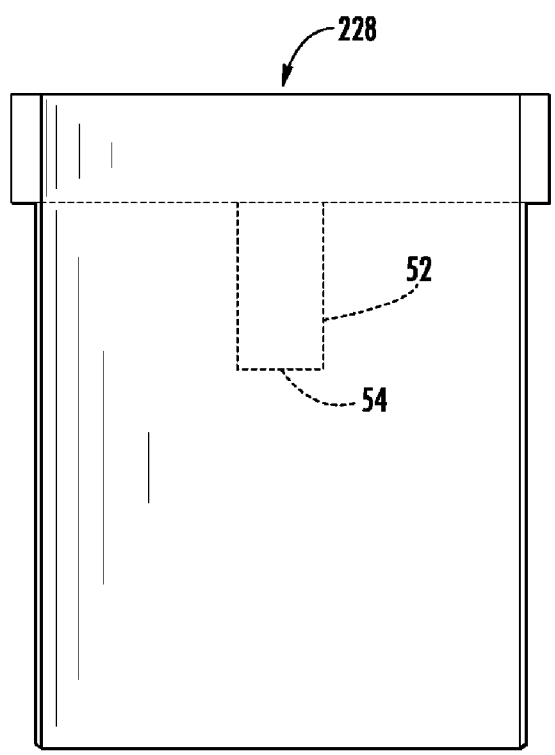
FIG. 12 is a top view of a gasket release tool having a longitudinal stop bar disposed thereon.
Figure 13:
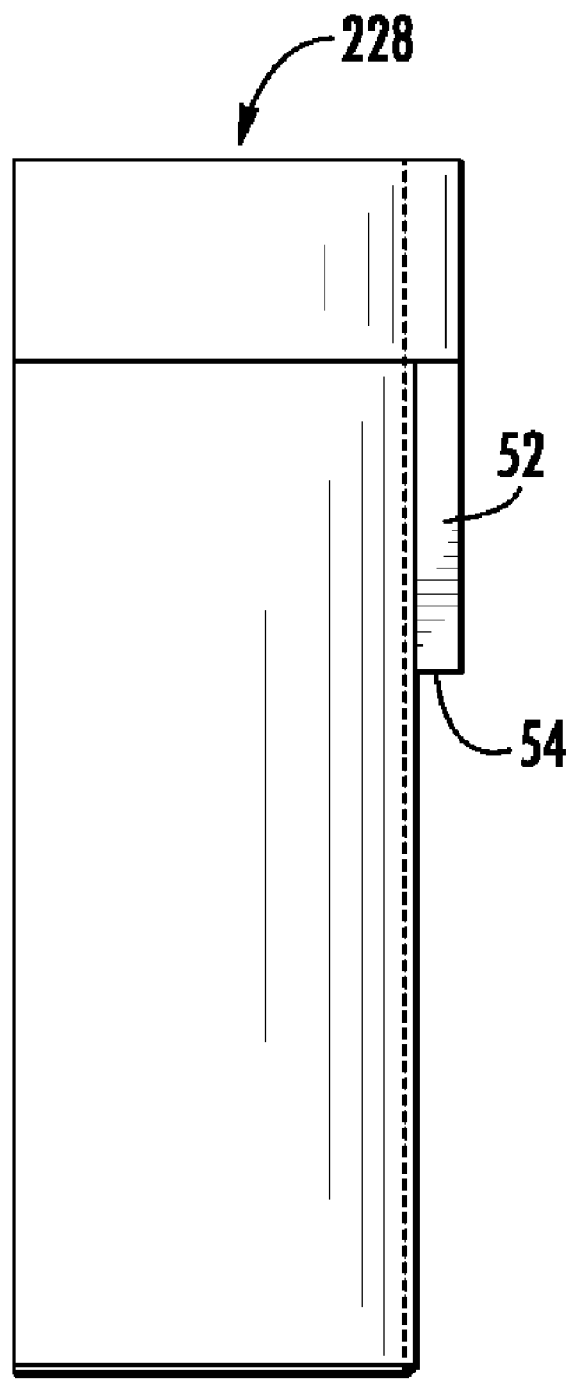
FIG. 13 is a side view of the gasket release tool of FIG. 12.

FIGS. 12 and 13 depict another tool 228 wherein optional stop means include a longitudinal bar 52 having a stop face 54. The longitudinal bar 52 may be simply welded to the outer surface of the tool 228 and has a length selected to contact the pipe end face 16 when the appropriate depth is reached.

Figure 14:
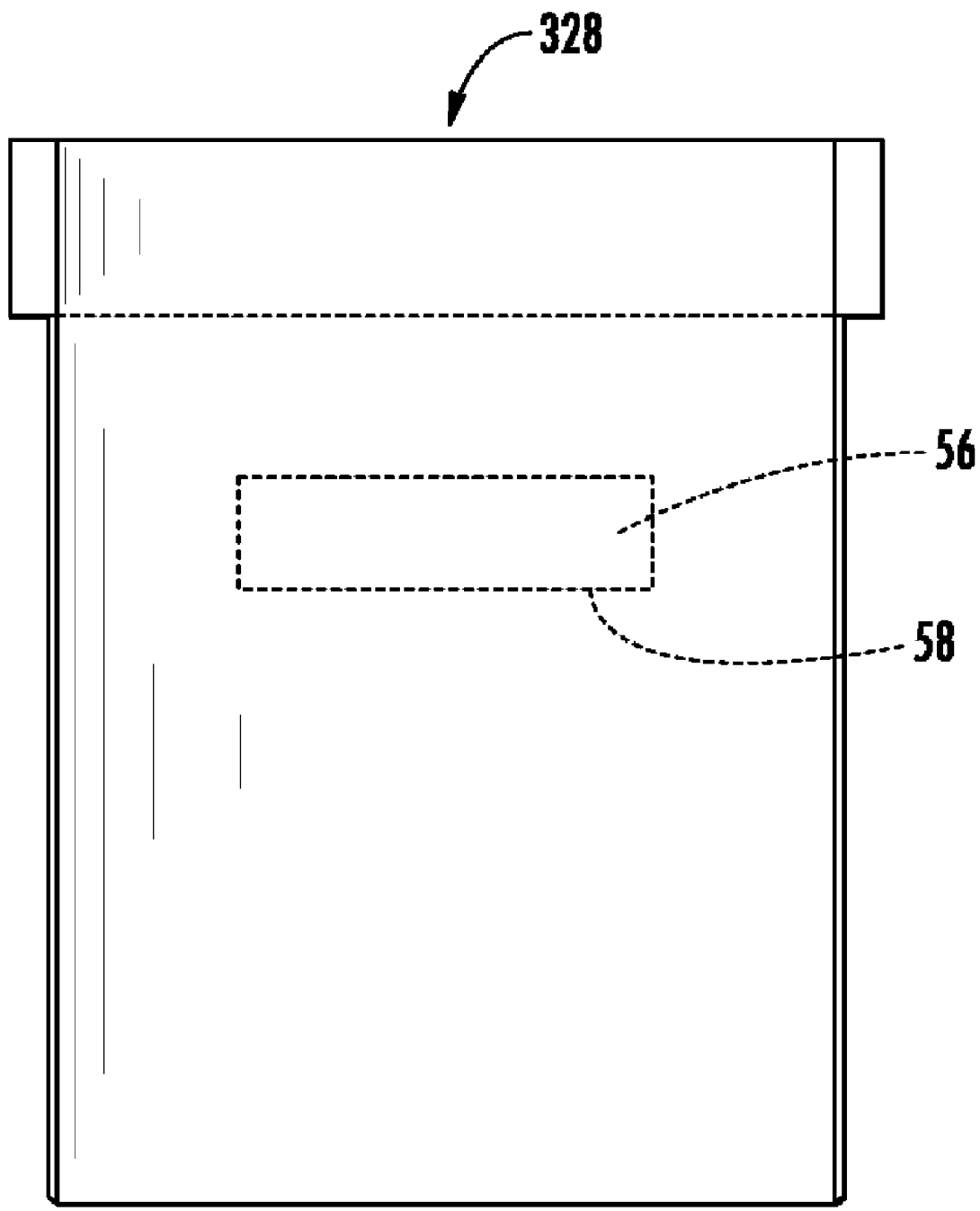
FIG. 14 is a top view of a gasket release tool having a lateral stop band disposed thereon.
Figure 15:
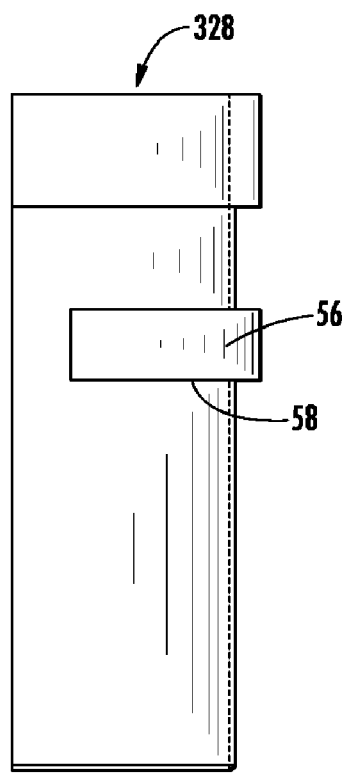
FIG. 15 is a side view of the gasket release tool of FIG. 14
Figure 16:
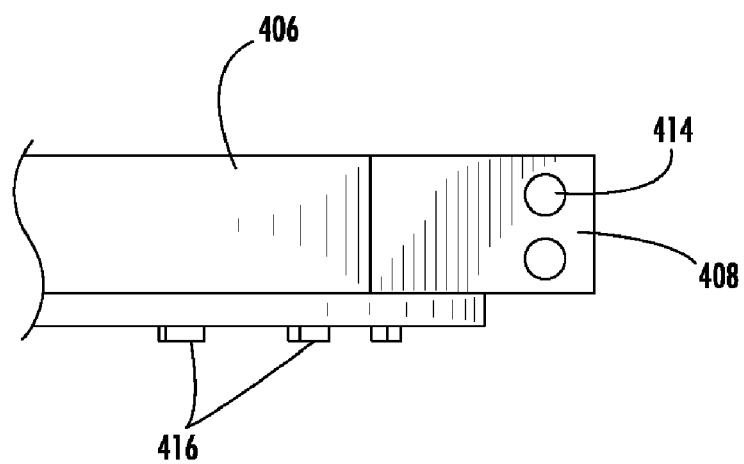
FIG. 16 is a top view of a portion of a driving apparatus for use with the release tool.

FIGS. 14 and 15 depict yet another tool 328 wherein optional stop means include a circumferential strap 56 having a stop edge 58. The circumferential strap 56 may be simply welded to the outer surface of the tool 328 in a position so that the stop edge 58 contacts the pipe end face 16 when the appropriate depth is reached.

Figure 17:
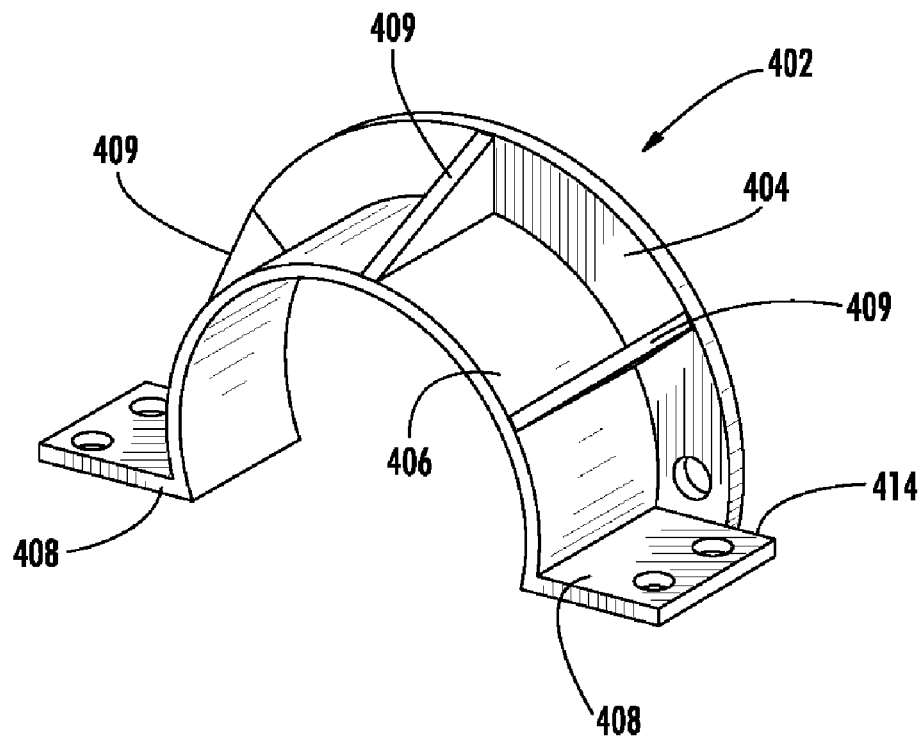
FIG. 17 is a perspective view of a portion of the driving apparatus shown in FIG. 16.
Figure 18:
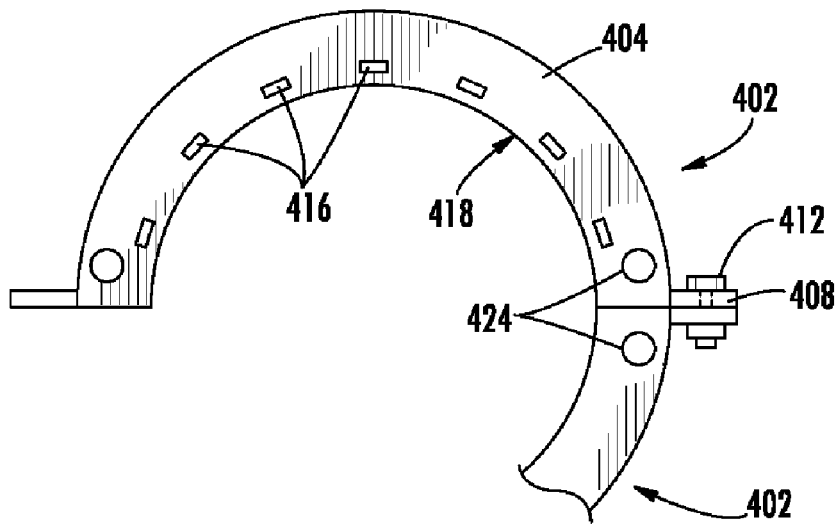
FIG. 18 is a partial end view of the driving apparatus shown in FIG. 16.
Figure 19:
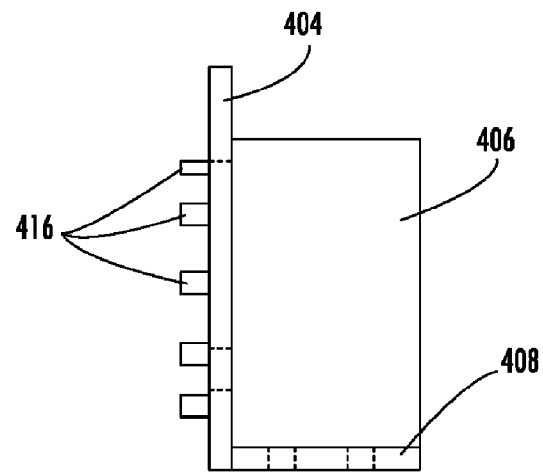
FIG. 19 is a side view of the driving apparatus shown in FIG. 16

FIGS. 16-19 illustrate a ring segment 402 of an exemplary driving apparatus 400 for use with the gasket release tool 28. The ring segment 402 includes an annular flange 404, which in the illustrated example is semi-circular, supported by an axially-extending annular band 406 which incorporates radially-extending connector flanges 408. The ring segment 402 is constructed using suitable techniques and materials to withstand the expected loads in service. For example, it may be welded together from a material such as 1.27 mm (½ in.) thick steel. Optional gussets 409 may be used to provide additional support between the annular flange 404 and the annular band 406, as shown in FIG. 17.

Two or more ring segments 402 are connected together to form a first driving ring 410. In the illustrated example, two semi-circular ring segments 402 are connected with bolts 412 through holes 414 in the connector flanges 408. It is also possible that the first driving ring 410 could be made up from a greater number of ring segments each less than 180° in arc length.

If desired, one or more restraints 416 made be disposed on the front face 417 of the annular flange 404. The restraints 416 are spaced away from the inner edge 418 of the annular flange a distance approximately equal to the thickness of the reinforcing collar 32. These restraints 416 help hold the gasket release tool 28 in position during use, as explained in more detail below.

Figure 20:
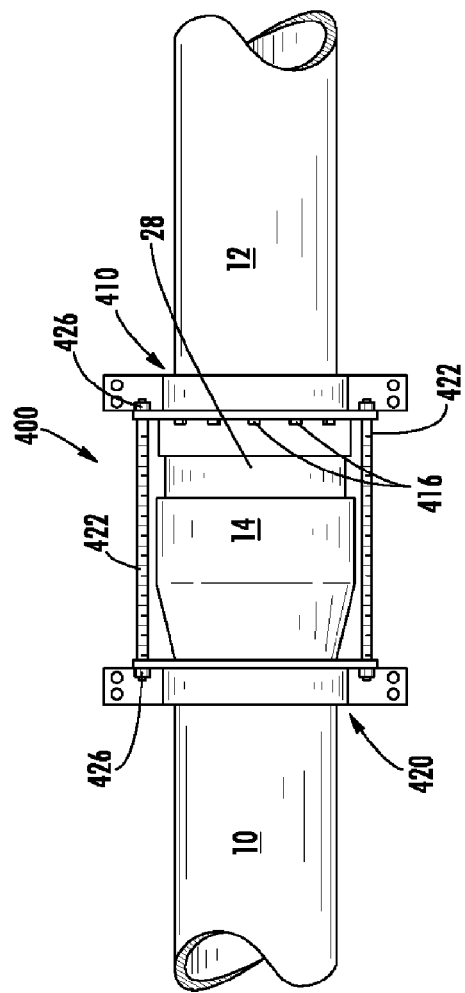
FIG. 20 is a top view of a driving apparatus positioned to disassemble a pipe joint.
Figure 21:
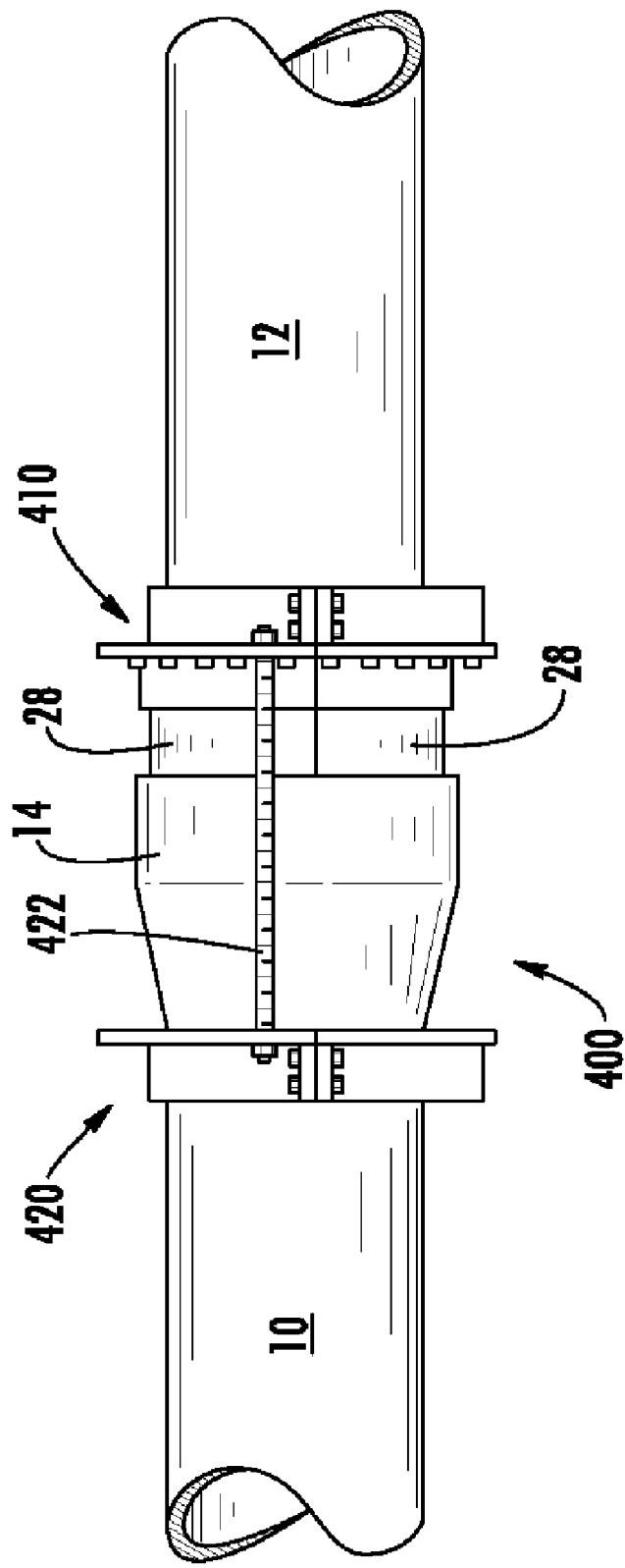
FIG. 21 is a side view of the driving apparatus shown in FIG. 20.

FIGS. 20 and 21 illustrate how the driving apparatus 400 is used to disassemble first and second joined pipes 10 and 12. Initially, the gasket release tool 28 is prepared for use by placing it in contact with the outer surface 26 of the second pipe 12, as described above. As many gasket release tools 28 are used as needed to encircle the second pipe 12. For example, if a 180° arc tool is used, then two identical gasket release tools 28 will be placed on opposite sides of the second pipe 12. The gasket release tool 28 is slid forward until its forward edge 34 contacts the teeth 24 of the metal segments 22.

The first driving ring 410 is secured around the second pipe 12, with the annular flange 404 facing towards the socket 14 in contact with the reinforcing collar 32 of the gasket release tool 28. The inside diameter of the annular flange 404 is chosen such that it can slide over the first pipe 10, but that it will abut the gasket release tool 28 in an axial direction. The restraints 416, if used, bear against the radially outer surface of the reinforcing collar 32, so that it can not deflect outwards during a disassembly operation.

A second driving ring 420, substantially identical to the first driving ring 410, is assembled around the first pipe 10, behind the exterior of the socket 14. Driving means which are capable of pulling the first and second driving rings 410 and 420 together then connected between the first and second driving rings 410 and 420. In the illustrated example, the driving means comprise externally threaded rods 422 which extend through openings 424 (see FIG. 18) in the first and second driving rings 410 and 420, respectively. Nuts 426 are threaded on opposite ends of the threaded rods 422.

The gasket release tool 28 is then driven in by using the driving means to pull the first and second driving rings 410 and 420 together, for example by tightening the nuts 426 with an appropriate tool. The second driving ring 420 will bear against the socket 14 while the first driving ring 410 bears against the gasket release tool 28 to cause it to slide into the pipe joint and be interposed between the segments 22 and the second pipe 12, as shown in FIG. 9. The driving means provide high mechanical advantage so that a high driving force can be generated with a relatively low amount of effort by an operator. The gasket release tool 28 is also less likely to suffer wear or damage since no sledge hammer or other impact tool is used. The chamfer 43 helps the body 30 of the gasket release tool 28 to slide under the teeth 24. In this position, the gasket release tools 28 simultaneously release all of the segments 22 so that they cannot bite into the second pipe 12. The friction force between the gasket release tool 28 and the outer surface 26 of the second pipe 12 is substantially less than the gripping force of the teeth 24. Therefore, the first and second pipes 10 and 12 can be easily slid apart in the direction of the arrows in FIG. 9. Once the pipes 10 and 12 have been separated, the gasket release tool 28 may be removed. The first and second pipes 10 and 12 will be undamaged and ready for reuse. The gasket 20 may also be suitable for reuse in some situations.

Figure 22:
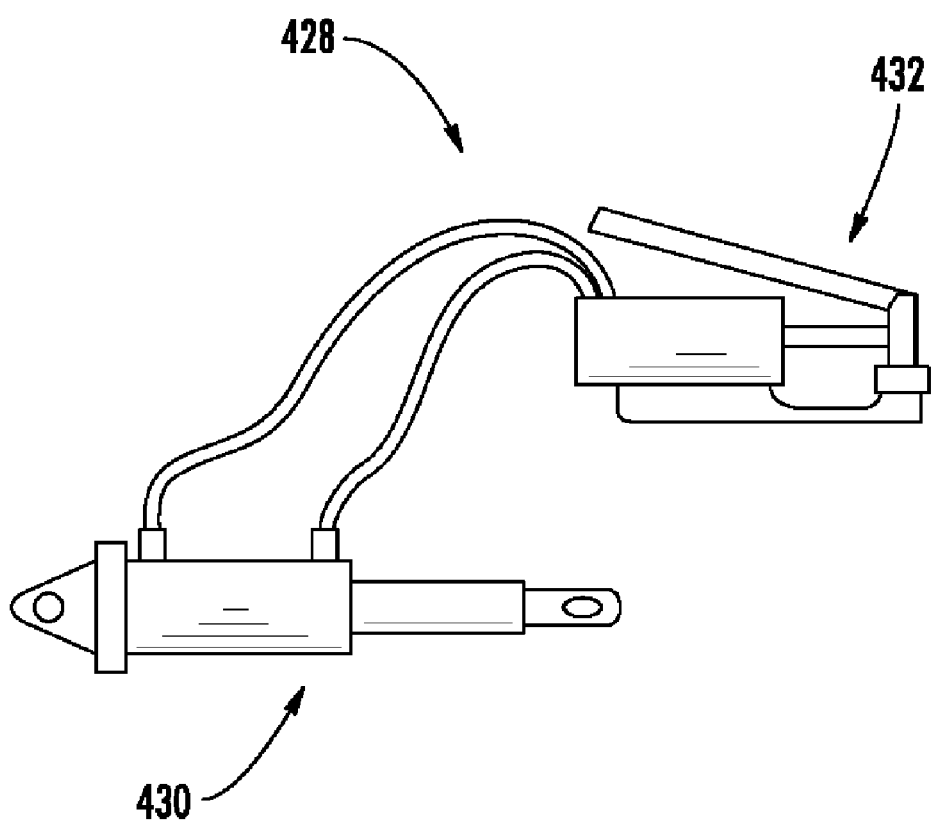
FIG. 22 is a schematic side view of a hydraulic apparatus for use with the present invention.

FIG. 22 illustrates a known type of portable hydraulic apparatus 428 comprising a double-acting cylinder 430 and a hand pump 432, connected by appropriate piping and valves. Opposite ends of the cylinder 430 may be connected to the first and second driving rings 410 and 420 to serve as the driving means instead of the threaded rod 422.

The gasket release tool 28 and method described above results in a substantial savings of time and cost compared to prior art methods. It allows the disconnection of pipe joints in a matter of minutes instead of hours required by prior art methods. The gasket release tool 28 is durable and reusable. Furthermore, the tool allows the reuse of some or all of the piping components, which substantially reduces expenses.

The foregoing has described a gasket release tool and a method for disconnecting pipes joined with a toothed gasket. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. An apparatus for separating a pipe joint of the type comprising a first pipe received inside an enlarged socket of the second pipe and restrained therein by a resilient gasket carrying an annular array of toothed rigid segments which engage an outer surface of the first pipe to prevent withdrawal thereof, the apparatus comprising:
    a first and a second gasket release tool that each have a body, wherein each body is formed into an arcuate shape and is adapted to be received between the first and second pipes such that the first and second gasket release tools are not overlapping; and
    a driving apparatus, comprising:
        a first driving ring adapted to be mounted around one of the pipes and sized to bear against the gasket release tool;
        a second driving ring adapted to be mounted around the other one of the pipes and sized to bear against the socket; and
        driving means for drawing the first and second driving rings together so as to drive the gasket release tools into the joint; and
    wherein each of the driving rings comprises one or more arcuate ring segments adapted to be joined together.

2. The tool of claim 1 wherein the body extends through an angle of approximately 180 degrees in a circumferential direction.

3. The tool of claim 1 wherein the body extends through an angle of approximately 120 degrees in a circumferential direction.

4. The tool of claim 1 wherein the body extends through an angle of approximately 90 degrees in a circumferential direction.

5. The tool of claim 1 further comprising a stop disposed on the body to indicate a preselected depth to which the tool is to be driven in use.

6. The apparatus of claim 1 wherein each of the ring segments comprises:
    an annular flange; and
    an annular band extending axially from the annular flange.

7. An apparatus for separating a pipe joint of the type comprising a first pipe received inside an enlarged socket of the second pipe and restrained therein by a resilient gasket carrying an annular array of toothed rigid segments which engage an outer surface of the first pipe to prevent withdrawal thereof, the apparatus comprising:
    at least two gasket release tools that each have a body formed into an arcuate shape, wherein the respective bodies of the gasket release tools are adapted to be received side by side and not overlapping between the first and second pipes; and
    a driving apparatus, comprising:
        a first driving ring adapted to be mounted around one of the pipes and sized to bear against the at least two gasket release tools;
        a second driving ring adapted to be mounted around the other one of the pipes and sized to bear against the socket; and
        driving means for drawing the first and second driving rings together so as to drive the gasket release tools into the joint; and
    wherein the driving means comprises at least one rod connecting the first and second driving rings, the rod engaging at least one fastener such that relative movement of the rod and the fastener causes axial motion of the driving rings.

8. The apparatus of claim 7 wherein the body extends through an angle of approximately 180 degrees in a circumferential direction.

9. The apparatus of claim 7 wherein the body extends through an angle of approximately 120 degrees in a circumferential direction.

10. The apparatus of claim 7 wherein the body extends through an angle of approximately 90 degrees in a circumferential direction.

11. The apparatus of claim 7 further comprising a stop disposed on the body to indicate a preselected depth to which the tool is to be driven in use.

12. An apparatus for separating a pipe joint of the type comprising a first pipe received inside an enlarged socket of the second pipe and restrained therein by a resilient gasket carrying an annular array of toothed rigid segments which engage an outer surface of the first pipe to prevent withdrawal thereof, the apparatus comprising:

at least one gasket release tool having a body formed into an arcuate shape and adapted to be received between the first and second pipes; and a driving apparatus, comprising:

a first driving ring adapted to be mounted around one of the pipes and sized to bear against the at least two gasket release tools;

second driving ring adapted to be mounted around the other one of the pipes and sized to bear against the socket; and driving means for drawing the first and second driving rings together so as to drive the gasket release tool into the joint, the driving means including at least one hydraulic cylinder connecting the first and the second driving rings; and means for selectively supplying pressurized fluid to hydraulic cylinder.

13. The apparatus of claim 12 wherein the body extends through an angle of approximately 180 degrees in a circumferential direction.

14. The apparatus of claim 12 wherein the body extends through an angle of approximately 120 degrees in a circumferential direction.

15. The apparatus of claim 12 wherein the body extends through an angle of approximately 90 degrees in a circumferential direction.

16. The apparatus of claim 12 further comprising a stop disposed on the body to indicate a preselected depth to which the tool is to be driven in use.

* * * * *